July 22, 1969
W. D. MYERS
3,456,764
APPARATUS AND METHOD FOR ABSORBING SHOCK LOADS
Filed April 4, 1967
3 Sheets-Sheet 1
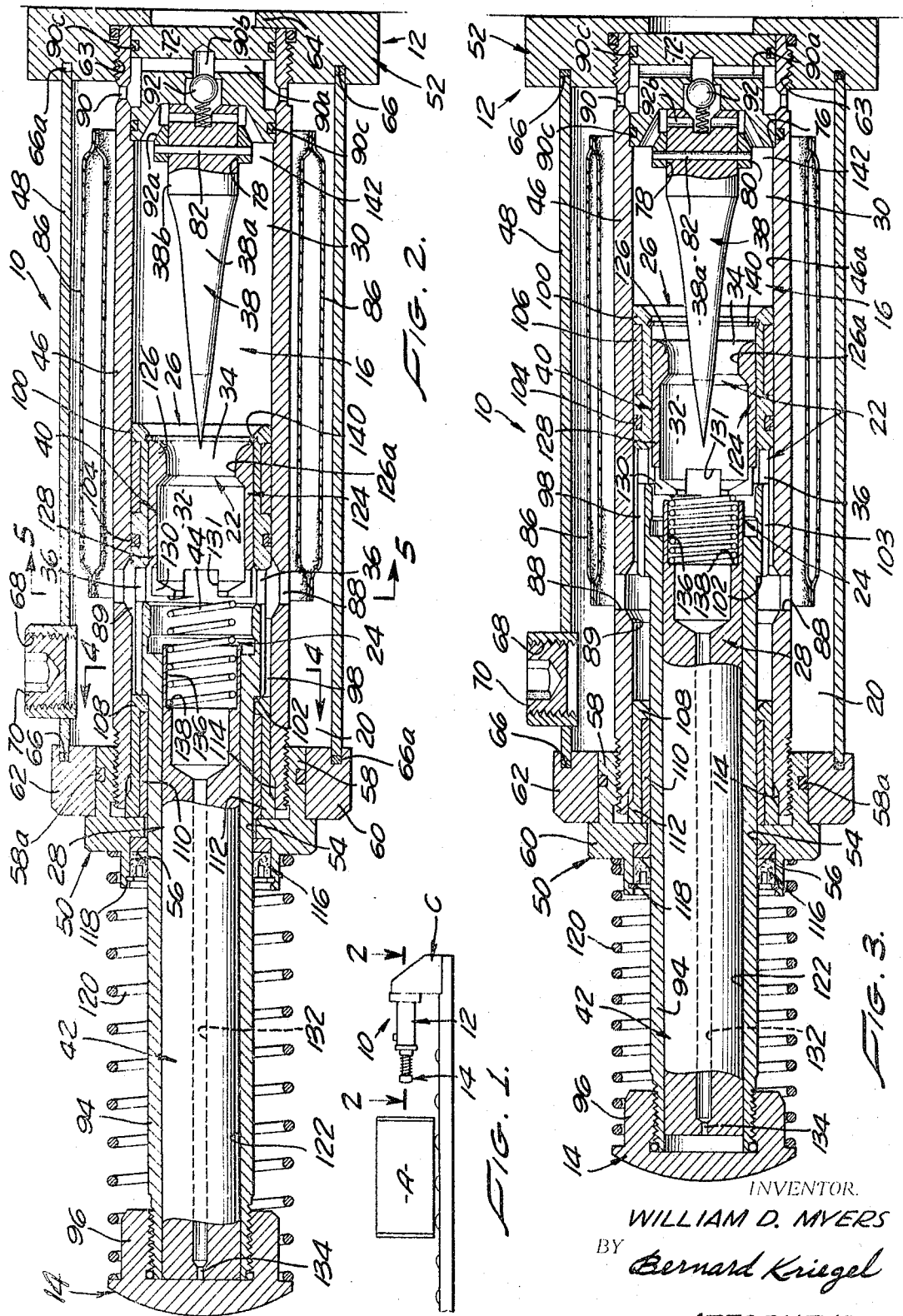
INVENTOR.
WILLIAM D. MYERS
BY Bernard Kriegel
ATTORNEYS

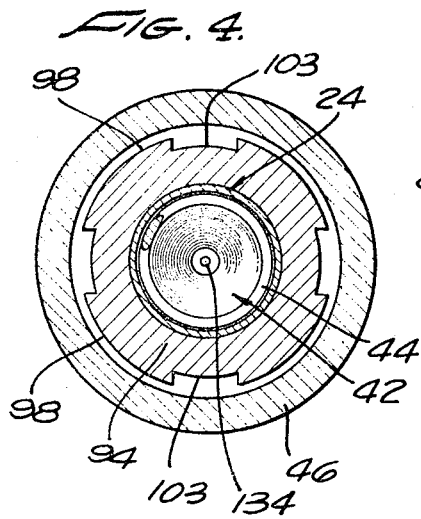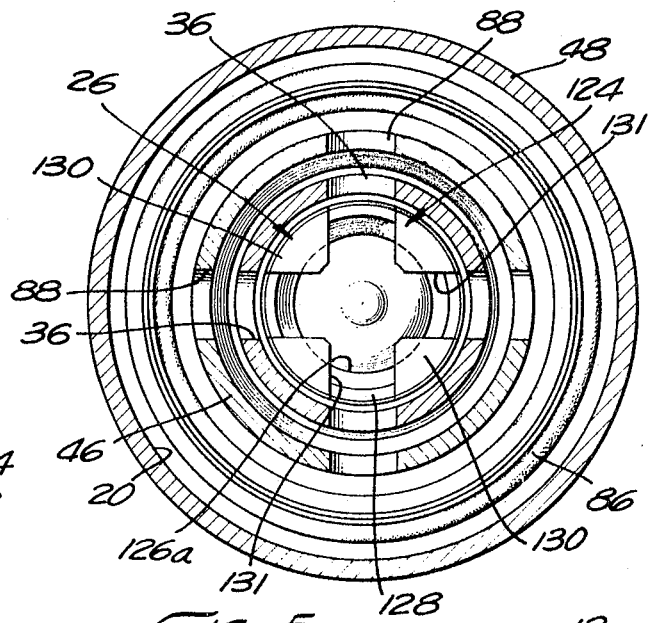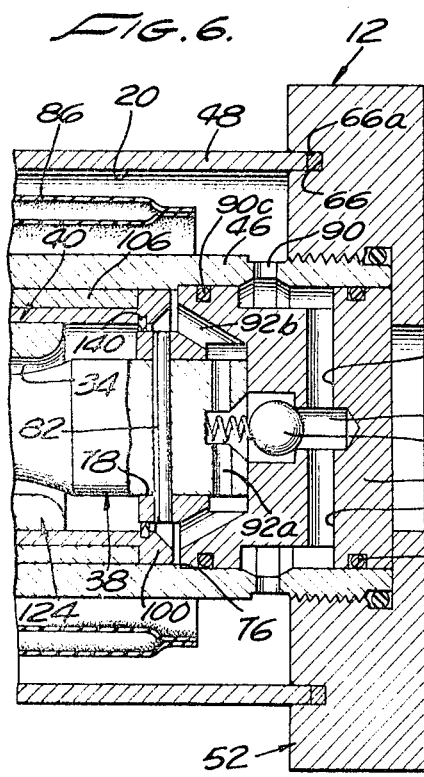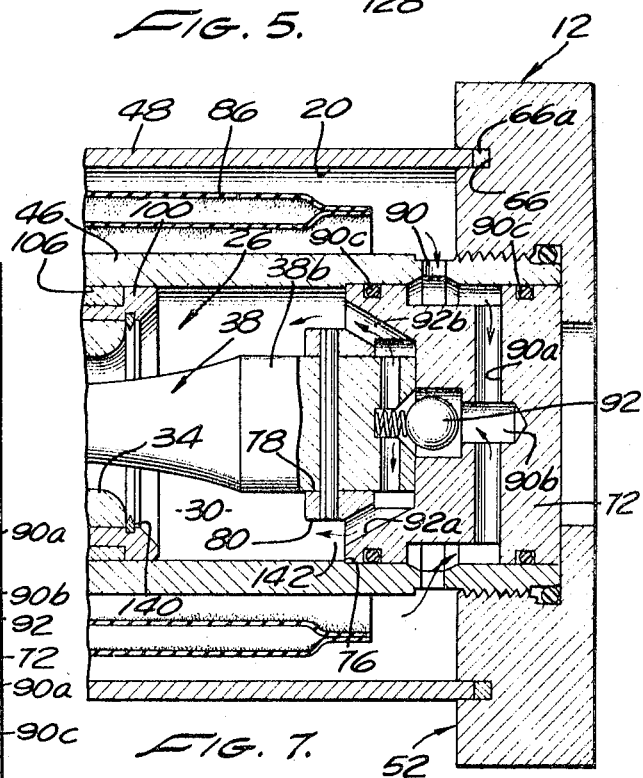

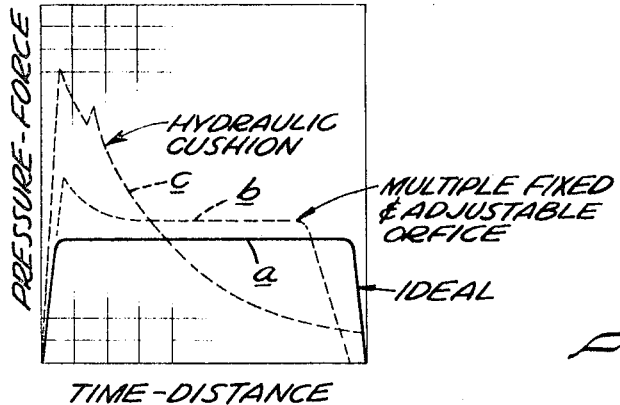
FIG. 8.
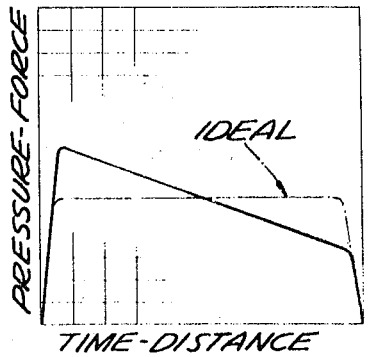
FIG. 9c. (INSUFFICIENT CONTROL MASS)
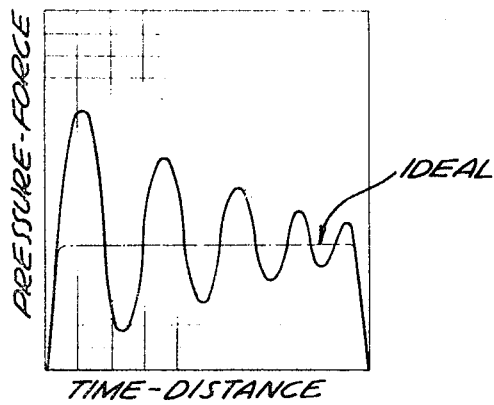
FIG. 9a. (INSUFFICIENT DAMPING)
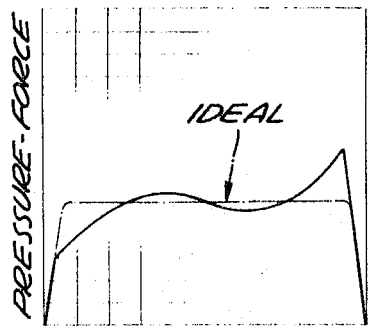
FIG. 9d. (EXCESSIVE CONTROL MASS & IMPROPER ORFICE NEEDLE SIZING.)
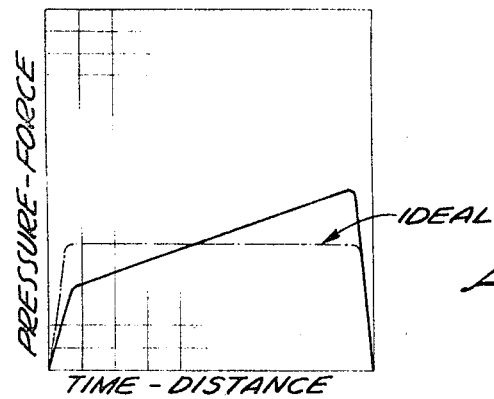
FIG. 9b. (EXCESSIVE CONTROL MASS.)
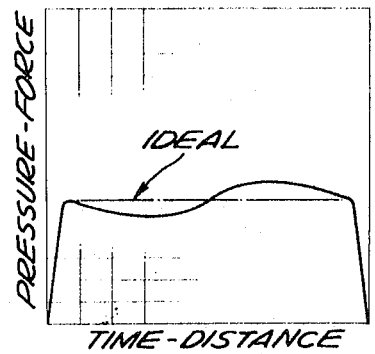
FIG. 9e. (IMPROPER ORFICE NEEDLE SIZING.)
INVENTOR.
WILLIAM D. MYERS
BY Bernard Kriegel
ATTORNEYS

3,456,764
APPARATUS AND METHOD FOR ABSORBING SHOCK LOADS
William D. Myers, Houston, Tex., assignor to Baker Oil Tools, Inc., City of Commerce, Calif., a corporation of California
Filed Apr. 4, 1967, Ser. No. 628,365
Int. Cl. F16d *57/00;* B61k *7/00;* B61g *11/00*
U.S. Cl. 188—96               9 Claims

ABSTRACT OF THE DISCLOSURE

The invention relates to a load responsive hydraulic shock absorber operable over a wide range of load conditions without manual adjustment and having automatic pressure regulating means for regulating the fluid pressure active on the driven member of the shock absorber in response to both the travel of the member and the kinetic energy of the load in such a way as to maintain a constant retarding force on the member proportional to the load energy for retarding the load to a given terminal velocity at a uniform rate of deceleration regardless of load conditions.

---

This invention relates generally to energy absorption devices of the kind which are commonly referred to as shock absorbers. More particularly, the invention relates to a novel load responsive hydraulic shock absorber and shock absorbing method characterized by a generally uniform rate of energy absorption and a fixed terminal velocity over a wide range of load conditions without manual adjustment.

Hydraulic shock absorbers are utilized in a wide variety of applications for progressively dissipating or absorbing the kinetic energy of a moving load over a given distance in such a way as to decelerate or arrest the load without creating high intensity shock forces on the load, shock absorber, or its supporting structure. Some shock absorbers are designed to dissipate the entire work load energy and thus retard or decelerate the load to a zero terminal velocity. Other shock absorbers are designed to dissipate a portion only of the work load energy and thereby decelerate the load from its initial or impact velocity to a predetermined lower terminal velocity. As will appear from the ensuing description, the shock absorber of the present invention may be employed to advantage in both of these types of applications. In this regard, attention is directed to the fact that the expressions "arresting," "retarding," and the other similar descriptive terms used in this disclosure are intended to encompass both partial and total dissipation of the work load energy, and, therefore, both partial deceleration of a work load to a predetermined terminal velocity and total deceleration of a work load to a zero terminal velocity.

A great variety of hydraulic shock absorbers have been devised. These existing shock absorbers may be classified generally as single fixed orifice hydraulic cushions or shock absorbers, single variable orifice shock absorbers, multiple fixed orifice shock absorbers, and multiple adjustable orifice shock absorbers. While the existing shock absorbers differ in construction, they all employ the same basic energy absorption principle, which is a viscous damping action involving utilization of the work load energy to displace the hydraulic fluid from a chamber through one or more restrictions or orifices. The resulting fluid pressure in the chamber produces on the work load a reactionary retarding or arresting force proportional to the fluid pressure. These existing shock absorbers, though satisfactory for some applications, possess certain inherent deficiencies which the present invention seeks to cure.

A simple hydraulic shock cushion, for example, may comprise a hydraulic cylinder containing a plunger and a single orifice of fixed area through which hydraulic fluid is displaced in response to impact of a work load against the plunger and resultant movement of the plunger through its working stroke relative to the cylinder. A major disadvantage of such a hydraulic cushion resides in the fact that the fluid pressure in the cylinder, and hence the retarding force exerted on the work load, rise to peak intensity immediately after initial impact of the load with the plunger and then progressively diminish during the remainder of the plunger stroke. This results in non-uniform deceleration of the work load. Moreover, if the kinetic energy of the load exceeds the load rating or capacity of the hydraulic cushion to any appreciable extent, harmful shock forces may be generated at impact and/or the work load may have an excessive terminal velocity which results in the generation of additional high intensity shock forces at the end of the plunger stroke. On the other hand, if the work load energy is substantially less than that for which the hydraulic cushion is designed, the plunger may fail to complete its stroke.

The existing single variable orifice and multiple fixed orifice shock absorbers alleviate, to a degree, the noted disadvantages of the simple hydraulic cushion. One type of single variable orifice shock absorber, for example, has a pair of relatively movable members which define therebetween an annular orifice through which the working fluid is displaced during the working stroke of the shock absorber and which are tapered in such a way that the orifice is progressively constricted, and its effective area is thereby progressively reduced during the stroke. A typical multiple fixed orifice shock absorber has a cylinder containing a number of orifices spaced therealong which are successively covered by the plunger during its working stroke, whereby the total effective orifice area is progressively reduced. Shock absorbers of this kind may be so designed that under normal load conditions, the flow of working fluid from the cylinder is progressively reduced at the proper rate to maintain relatively constant fluid pressure in the cylinder and, thereby, a relatively constant retarding force on the work load throughout substantially the entire working stroke. Under normal load conditions then, these shock absorbers are effective to retard or arrest a work load at a generally uniform rate of deceleration. However, if such shock absorbers are subjected to abnormal load conditions, they may exhibit certain of the same deficiencies as the simple hydraulic cushion, to wit, peak pressure and hence peak retarding force at impact, excessive terminal velocity, or incomplete stroking of the plunger.

The existing multiple adjustable orifice shock absorbers were designed to avoid the above-noted disadvantages of the variable area and multiple fixed orifice shock absorbers. A typical multiple adjustable orifice shock absorber, for example, has a number of orifices which are progressively covered by the plunger, in much the same way as occurs in the multiple fixed orifice shock absorber, and means for regulating or adjusting the effective areas of the orifices in such a way as to accommodate the shock absorber to a relatively wide range of load conditions. In this regard then, the multiple adjustable orifice shock absorber is superior to the other shock absorbers mentioned above. However, the multiple adjustable orifice shock absorber requires manual adjustment of its multiple orifices to the proper effective area for each load condition. As a consequence, if the load varies, or is improperly estimated, the latter shock absorber, like the other mentioned shock absorbers, may exhibit a peak pressure and hence a peak retarding force at impact, excessive terminal velocity, or incomplete stroking of its plunger.

The factors which cause the noted adverse operating characteristics of the existing shock absorbers are well understood and hence need not be explained in detail. Suffice it to say that these adverse characteristics result from the fact that even those existing shock absorbers which exhibit constant pressure and hence uniform deceleration under normal load conditions lack any load responsive means for automatically regulating the constant fluid pressure in response to the kinetic energy of the load in such a way as to establish a constant fluid pressure level of the proper magnitude to retard the load to the desired terminal velocity at a constant rate of deceleration regardless of the load conditions, i.e., the kinetic energy of the load.

It is a general object of the present invention to provide an automatic load responsive hydraulic shock absorber which is devoid of the above-noted and other deficiencies of the existing shock absorbers.

A more specific object of the invention is to provide an automatic load responsive hydraulic shock absorber, wherein the working fluid pressure and hence the retarding force active on the movable load-engaging member of the shock absorber during a working stroke occasioned by impact of a work load with the member is regulated in response to both the travel or displacement and the initial velocity of the member in such a way that the fluid pressure is maintained at a constant level proportional to the impact energy of the load throughout substantially the entire work stroke, whereby the shock absorber is effective to retard the load to a predetermined terminal velocity at a uniform rate of deceleration regardless of the impact energy of the load.

Another object of the invention is to provide a method of bringing a moving load to a terminal velocity, such as zero, at a uniform rate of deceleration.

A further object of the invention is to provide a hydraulic shock absorber of the character described, which is relatively simple in construction, economical to manufacture, reliable in operation, and otherwise ideally suited to its intended purposes.

This invention possesses many other advantages and has other objects which may be made more clearly apparent from a consideration of a form and method embodying the invention. This form and method are shown and described in the present specification and in the drawings accompanying and constituting a part thereof. They will now be described in detail, for the purpose of illustrating the general principles of the invention; but it is to be understood that such detailed description is not to be taken in a limiting sense.

Referring to the drawings:

FIGURE 1 illustrates a typical installation for a shock absorber according to the invention;

FIG. 2 is an enlarged section taken on line 2—2 in FIG. 1 and illustrating the shock absorber in its normal ready condition;

FIG. 3 is a section similar to FIG. 2 showing the shock absorber during the working stroke of its plunger;

FIG. 4 is a section, on an enlarged scale, taken on the line 4—4 in FIG. 2;

FIG. 5 is a section, on an enlarged scale, taken on the line 5—5 in FIG. 2;

FIG. 6 is an enlarged section through the forward end of the shock absorber at the conclusion of the working stroke;

FIG. 7 is a section similar to FIG. 6 during the return stroke of the plunger;

FIG. 8 is a chart depicting the pressure curves of certain shock absorbers; and

FIGS. 9a through 9e are charts depicting the pressure curves which result from improper sizing and proportioning of the parts of the present shock absorber.

In general terms, the invention is directed to a shock absorber 10 having relatively stationary and movable members 12 and 14 defining therebetween work chamber means 16 containing hydraulic working fluid which is displaced by movement of the driven member 14 through a working stroke occasioned by impact of a work load against the member, from the chamber means to an expansion chamber or reservoir 20 through orifice means 22 to produce a hydraulic retarding force on the driven member, and automatic load responsive pressure regulating means 24 for regulating fluid flow through the orifice means in response to both the travel or displacement and the initial velocity of the load-engaging member in such manner as to maintain within the chamber means constant fluid pressure proportional to the impact energy of the work load and of the proper magnitude, to retard the load to a predetermined terminal velocity at a uniform rate of deceleration regardless of the work load energy. To this end, the pressure regulating means 24 performs two distinct pressure regulating functions which are referred to herein, respectively, as primary regulation and secondary regulation. Primary regulation involves progressive reduction of fluid flow from the working chamber means 16 to the reservoir 20 in response to and in accordance with a function of the work stroke travel or displacement of the driven member 14, which tends to maintain a constant fluid pressure in the chamber means during uniform deceleration of the member, and hence a constant retarding force on the member as the latter decelerates under any given load condition. Secondary regulation involves regulation of fluid flow from the working chamber means to the reservoir in accordance with a function of the initial work stroke velocity of the driven member, and hence the kinetic energy of the load, which tends to adjust the constant fluid pressure, and thereby the constant retarding force, to the level required to retard the load, regardless of its energy, at a uniform rate to the desired terminal velocity over the stroke length of the driven member. The regulating means embody primary flow regulating mechanism 26 for effecting primary regulation and secondary regulating mechanism 28 for effecting secondary regulation.

In the embodiment of the invention which has been selected for illustration in the drawings, the working chamber means 16 comprise a primary, high pressure working chamber 30 and a secondary, low pressure working chamber 32. The orifice means 22 comprise a primary control orifice 34 which communicates the working chambers 30, 32, and one or more flow ports 36 which communicates the low pressure chamber to the reservoir 20. During the working stroke of the driven member 14, working fluid is displaced from the high pressure chamber 30 to the low pressure chamber 32 through the control orifice 34, and from the low pressure chamber to the reservoir 20 through the flow ports 36. The primary regulating mechanism 26 of the regulating means 24 comprise a pair of orifice regulating elements 38 and 40 which are carried, respectively, by the members 12, 14 and undergo relative movement during the working stroke of the driven member along the direction line of movement of the latter member. Regulating element 38 is rigidly secured to and remains stationary with the member 12, and, for this reason, it is hereinafter referred to in places as a stationary element. Regulating element 40 is free to move or float relative to the driven member 14, along the direction line of movement of this member, and is hereinafter referred to in places as a floating element. Regulating elements 38, 40 define therebetween the control orifice 34 and are shaped to effect progressive constriction, i.e., progressive reduction of the effective area, of the orifice, and thereby progressive reduction of fluid flow from the high pressure working chamber 30 to the low pressure working chamber 32 during the working stroke of the driven member 14, and in accordance with function of the travel or displacement of this member. More specifically, the regulating elements are shaped to progressively reduce the flow of working fluid from the high pressure working chamber to the low pressure working chamber during the working stroke of the driven member in a way which tends to maintain a constant fluid pressure in the high pressure chamber during uniform deceleration of the driven member. The secondary regulating mechanism 28 of the regulating means 24 comprise the floating regulating element 40, a control mass 42, and a control spring 44. Floating movement of the floating regulating element 40 relative to the driven member 14 is effective to regulate the area of the control orifice 34 independently of the work stroke travel or displacement of the driven member and to simultaneously regulate the effective area of the flow ports 36 in inverse relation to the orifice area, thereby to regulate the relative effective areas of the orifice and flow ports. Thus, forward movement of the floating element relative to the driven member, in the direction of the work stroke travel of this member, simultaneously reduces the orifice area and increases the port area. Rearward movement of the floating element relative to the driven member simultaneously increases the orifice area and reduces the port area.

Control means 42 is carried by the driven member 14 and is free to float relative to this member in the direction of its travel. The control spring 44 has a relatively low spring rate and acts between the floating regulating element 40 and the control mass 42. As will appear from the ensuing description, during a working stroke of the driven member 14, the pressure drop across the control orifice 34 and the control mass 42 create opposing fluid pressure and inertial forces on the floating regulating element 40, which constantly position this element relative to the driven member by a force balancing action, and thereby regulate the effective areas of the orifice and flow ports 36 in such a way as to maintain constant fluid pressure in the working chambers 30, 32, and hence a constant retarding force on the driven member proportional to the initial velocity of the member, and hence the kinetic energy of the work load, and of the proper magnitude to uniformly decelerate the member and load to the desired terminal velocity regardless of the load energy.

Briefly, in operation of the shock absorber, the latter normally assumes its ready or initial condition of FIG. 2. In this ready condition, the driven member 14 occupies its rear limiting or fully extended position relative to the stationary member 12, and the floating orifice regulating element 40 and control mass 42 are urged by the control spring 44 to their forward and rear limiting positions, respectively, relative to the driven member, as shown. The control orifice 34 and the flow ports 36 now have maximum effective area. When a moving work load strikes the member 14, this member and the control mass 42 are accelerated to an initial velocity and the member is driven through its working stroke relative to the stationary member 12. Working fluid is thereby displaced from the high pressure working chamber 30 to the low pressure working chamber 32 through the control orifice 34 and from the low pressure chamber to the reservoir 20 through the flow ports 36. A hydraulic retarding force is thus exerted on the driven member, which decelerate the latter and the work load to the desired terminal velocity at the end of the working stroke. During this working stroke, the primary regulating mechanism 26 of the pressure regulating means 24 progressively reduces the effective area of the control orifice 34 and hence fluid flow from the high pressure chamber 30 through the low pressure chamber 32 to the reservoir 20 in accordance with a function of work stroke travel or displacement, which tends to maintain constant pressure in the chambers as the member 14 decelerates under any given load condition. The secondary regulating mechanism 28 tends to constantly adjust or regulate the effective areas of the orifice and the flow ports in response to the pressure drop across the orifice and the inertial force of the control mass 42 in such a way as to maintain the constant fluid pressure in the chambers at the proper levels to uniformly decelerate the driven member and load to a predetermined terminal velocity regardless of the load energy.

Referring now in greater detail to the shock absorber which has been selected for illustration in the drawings, the stationary member 12 comprises a cylinder having concentric, radially spaced inner and outer sleeves 46 and 48. Threaded on the ends of the inner sleeve 46 are rear and front end caps 50, 52. The rear end cap 50 has a central bore 54 counterbored at 56 to define a seal recess, and a cylindrical wall 58 which is internally threaded for connection to the inner sleeve 46. At the rear end of this cylindrical wall is an annular shoulder 60 engaging a ring 62 slidably fitted over the cap wall 58. Leakage of fluid from the chamber 20 is prevented by a seal ring 58a on the wall 58 engaging the end ring 62. The front end cap 52 has a central recess 63 which is threaded for connection to the inner cylinder sleeve 46 and defines an annular shoulder 64 projecting across the front end of the leeve. The outer cylinder sleeve 48 extends between and has its ends fitted within circular grooves 66 in the confronting faces of the front end cap 52 and the rear end cap ring 62 and bearing against suitable gaskets 66a in the grooves 66. Extending through the outer cylinder sleeve is a filler opening 68, closed by a threaded plug 70, through which the cylinder 12 may be filled with hydraulic working fluid.

The front end of the inner cylinder sleeve 46 is internally recessed to receive a circular end closure or disc 72. This disc is confined between the front end cap shoulder 64 and an internal shoulder 76 on the inner sleeve. The rear portion of the disc 72 has a socket 78 receiving the front portion 38b of the stationary orifice regulating element 38, which, in this instance, is a control needle having a rearwardly tapering portion 38a. The control needle is secured to the end closure 72 within the socket by a pin 82.

The annular space between the cylinder sleeves 46, 48 defines the expansion chamber or reservoir 20. This reservoir contains an annular bag or bladder 86 filled with gas, such as air, under a pressure which is preferably atmospheric pressure. The annular space between the control needle 38 and the inner cylinder sleeve 46 defines the high pressure working chamber 30. Circumferentially spaced about the wall of the inner sleeve 46 in its rear portion are a plurality of side ports or openings 88 establishing communication between the reservoir 20 and an internal groove 89 in the sleeve 46 that communicates through the ports 36 with the low pressure working chamber 32. Fluid can pass in one direction only from the forward portion of the reservoir 20 to the high pressure working chamber 30. It can flow through side ports 90 in the sleeve 46 and through radial passages 90a in the cap or valve body 72 to a central chamber 90b therein, unseating a spring-loaded check valve 92 and passing therearound and through the passages 92a, 92b in the regulating element 38 and cap 72 to the high pressure working chamber 30. Seals 90c are provided between the cap 72 and sleeve 46 to prevent fluid leakage.

The driven member 14 of the shock absorber 10 comprises a plunger having a tubular rod or barrel 94 which extends slidably through the central bore 54 in the rear cylinder end cap 50. Thread on the outer or rear end of the barrel is an end cap or bumper 96 which seals the outer end of the barrel. The forward portion of the barrel 94 is externally stepped to a larger diameter within the cylinder 12 to define a land 98 and a forward piston 100 on the barrel. Land 98 defines a rearwardly presented annular shoulder 102 on the barrel and has an external diameter somewhat less than the internal diameter of the inner cylinder sleeve 46. The flow ports 36 extend through the barrel land contiguous to the plunger piston 100, communicating with external axial grooves or channels 103 in the barrel land 98 extending rearwardly to the shoulder 102. The plunger piston 100 is externally dimensioned to slide in the inner cylinder sleeve 46 and carries a seal or piston ring 104 and a wear ring 106 slidably engaging the inner sleeve.

Surrounding the plunger barrel 94 between the rear cylinder end cap 50 and the barrel shoulder 102 is a retaining sleeve 108 containing a wear ring 110. The wear ring 110 and retaining sleeve 108 slide or float in the rear portion of the inner cylinder sleeve 46, the sleeve having a rear external shoulder 112 movable in a rear counterbore 114 in the cylinder sleeve to limit floating, axial travel of the retaining sleeve. Fitted within the seal recess 56 in the rear cylinder end cap 50 is a seal ring or packing gland and wiper assembly 116 retained in position by a snap ring 118. A compression coil spring 120 surrounds the outwardly extending rear portion of the plunger barrel 94 and acts between the rear cylinder end cap 50 and the plunger end cap or bumper 96 for urging the plunger 14 to its rear, limiting or fully extended position. In this position, the plunger barrel shoulder 102 seats against the wear ring retaining sleeve 108, as shown in FIG. 2.

The plunger 14 has a central bore, the forward portion of which is enlarged to define the low pressure working chamber 32, the rear portion 122 of the central bore being of a smaller, constant diameter, extending from the low pressure chamber 32 to the end bumper 96. As noted earlier, and as shown in the drawings, the flow ports 36 in the plunger communicate the low pressure chamber 32 with the reservoir 20.

The floating orifice regulating element 40 of the load-responsive pressure regulating means 24 comprises a control regulator spool having a tubular body 124 which slides within the forward portion of the bore of the plunger 14. The forward portion of this spool body has an internal annular shoulder 126 providing an orifice passage 126a therethrough. The rear of the spool body 124 is constituted as a skirt 128 which terminates in an inwardly directed flange 130, the skirt and flange having ports or slots 131 through which fluid can flow between the interior of the body 124 and the flow ports 36.

Control mass 42 comprises a metal cylindrical bar or rod which slides axially in the bore 122 in the plunger barrel 94. Extending centrally through this bar is a passage 132 terminating in a rear, relatively small diameter damping orifice 134 which opens through the rear end of the bar, and having a forward counterbore 136 which opens through the front end of the bar, to provide a forwardly facing annular spring seat 138 at the rear end of the counterbore. The rear end of the control spring 44 is disposed within the counterbore 136 and engages the spring seat 138, its forward end bearing against the rear flange 130 on the control regulator spool 40. Control spring 44 thus urges the control mass 42 rearwardly relative to the plunger 14 to its rear limiting position of FIG. 2, wherein the rear end of the mass seats against the plunger bumper 96. The control spring urges the control regulator spool 40 forwardly relative to the plunger to its forward limiting position of FIG. 2, wherein the spool seats against a snap ring 140 in the plunger.

It is significant to note at this point that the flow ports 36 in the plunger 14 are fully uncovered or open when the control regulator spool 40 occupies its forward limiting position. Rearward displacement of this spool relative to the plunger results in progressive covering, and hence effective progressive constriction or throttling, of the flow ports by the skirt 128 of the spool body 124. It is also significant to note that the flow ports 36 remain in free communication with the inner sleeve openings 88 through the plunger land grooves or channels 103 and the clearance between the plunger land 98 and the inner cylinder sleeve 46 during the entire stroke of the plunger.

The control needle 38 and the internal shoulder 126 of the control regulator spool 40 define therebetween the variable area control orifice 34. When the plunger 14 is fully extended, the spool shoulder is located just rearwardly of the rear tip of the needle. The control orifice then has a maximum orifice area. During the forward working stroke of the plunger, the control regulator spool travels forwardly along the control needle 38 and the control orifice is progressively constricted, i.e. its effective area is progressively reduced, owing to the tapered configuration of the needle. As the plunger approaches the forward limit of its working stroke, the control regulator spool enters onto the cylindrical front portion 38b of the control needle, which extremity is dimensioned to fit closely within the central opening 126a through the spool shoulder 126, and, thereby to completely close the control orifice. At this forward limit of the plunger stroke, the plunger piston 100 enters an annular snubbing recess 142, which is defined between the inner cylinder sleeve 46 and the periphery of the annular shoulder 80 on the cylinder end disc 72. The radial width of this recess approximates the radial thickness of the piston, whereby entrance of the piston into the recess provides a hydraulic snubbing or locking action, as described below. The front end of the piston is bevelled, as shown, to render this snubbing action progressive in character.

The operation of the shock absorber will now be explained. Prior to use, the entire interior volume of the shock absorber, including the reservoir 20, working chambers 30, 32, the interior of the plunger barrel 94, and the various other internal spaces of the shock absorber are filled with hydraulic working fluid through the filler opening 68, with the plunger fully extended. However, the hydraulic liquid does not enter the sealed bladder 86 containing air at substantially atmopsheric pressure. As explained later, however, such complete filling of the shock absorber with the working fluid may be unnecessary in some applications. The filler opening is then resealed by the plug 70.

When installed in operative position, the cylinder 12 of the shock absorber is rigidly secured to a supporting structure in such way that the plunger 14 is disposed to be driven by the work loads to be retarded or arrested. FIG. 1, for example, illustrates a typical installation of the shock absorber. In this case, the cylinder 12 is bolted to the frame of a conveyor C and the plunger 14 is located for direct impact by each article A moving along the conveyor. In other applications, the work load may drive the plunger through an intermediate force transmission means.

In the normal ready condition of the shock absorber, the plunger 14 is yieldably retained in its fully extended position by the plunger spring 120. The control spring 44 yieldably retains the control regulator spool 40 and the control mass 42 in their forward and rear limiting positions, respectively. In this ready condition, the control orifice 34 and the flow ports 36 have maximum effective area.

When the plunger 14 is driven through its working stroke by a moving work load, the plunger and its contained control mass 42 are rapidly accelerated to an initial velocity, which is the load velocity in the event the shock absorber is installed in the manner illustrated in FIG. 1. Hydraulic fluid is thereby displaced from the high pressure working chamber 30 to the low pressure working chamber 32 through the control orifice 34 and from the low pressure chamber to the reservoir 20 through the flow ports 36 to produce a hydraulic retarding force on the plunger. As the plunger travels through its working stroke, the control regulator spool 40 advances along the control needle 38 to progressively reduce the effective area of the control orifice and hence flow of working fluid from the high pressure chamber through the low pressure chamber to the reservoir. The tapered portion 38a of the control needle has a concave curvature, as shown, which approximates in axial section an exponential curve. Accordingly, the control needle and the control regulator spool, which together constitute the primary regulating mechanism 26 of the flow regulating means 24, tend to progressively reduce the flow of working fluid from the cylinder bore 46a to the reservoir 20 by the advancing plunger 14 in accordance with an exponential function of the plunger travel or displacement. This flow regulating action constitutes the primary flow regulation referred to earlier and tends to maintain a constant fluid pressure in the bore, and hence a constant hydraulic retarding force on the plunger, as the latter decelerates under any given load condition.

The flow of working fluid through the control orifice 34, occasioned by initial acceleration of the plunger 14 by the work load, creates a pressure drop across the orifice and a resulting rearward pressure force on the control regulator spool 40. Spool 40 is moved rearwardly relative to the plunger by this force to position its skirt 128 partially across the ports 36, thereby diminishing the rate of progressive restriction of the control orifice by the control needle 38, and simultaneously reducing the effective flow area of the ports 36. This constriction or throttling of the ports increases the fluid pressure in the spool on the low pressure side of its orifice 126a and reduces the flow through the control orifice. Increasing cylinder pressure now decelerates the plunger, while the control mass 42 tends to remain at its initial velocity. As a consequence, the control mass exerts a forward inertial force on the control regulator spool through the control spring 44, which urges the spool forwardly relative to the plunger against the rearward pressure force on the spool. This inertial force is aided by the reduction in the pressure drop across the control orifice caused by throttling of the ports 36. Forward movement of the control regulator spool 40 relative to the plunger 14 increases the rate of progressive restriction of the control orifice 34 by the control needle 38, and simultaneously increases the effective area of the flow ports 36. This action reduces the pressure downstream of the orifice 126a and increases the flow therethrough. The decreasing downstream pressure tends to further increase the rate of flow through the orifice and decreases the rate of deceleration of the plunger, but the increased flow through and increased rate of progressive constriction of the control orifice result in an increase in the rearward pressure force on the control regulator spool which urges the spool rearwardly relative to the plunger to again reduce the effective area of the flow ports 36. This cyclic flow regulating action continues throughout substantially the entire working stroke of the plunger and constitutes the secondary flow regulation referred to earlier. The oscillatory motions, which thus tend to occur in the shock absorber during its working stroke, are damped by the working hydraulic fluid. In this regard, it will be recalled that the control mass 42 has a central damping orifice 134.

It is evident at this point that the pressure drop through the control orifice 34 and the control mass 42 produce opposing forces on the control regulator spool 40, which tend to constantly position the spool relative to the plunger in such a way as to maintain these forces in balance and maintain a constant pressure drop across the control orifice throughout substantially the entire working stroke of the plunger. The inertial force exerted on the spool by the control means, of course, is related to the initial velocity of the mass. This initial mass velocity is equal to the initial plunger velocity, which, in turn, is related to the kinetic energy of the work load at impact. Thus, the control regulator spool tends to constantly assume a balanced position relative to the plunger, under the action of the opposing inertial and pressure forces on the spool, wherein the pressure drop across the orifice, and the fluid pressure in the working chambers 30, 32 and resulting net hydraulic retarding force on the plunger, remain constant at levels related to the kinetic energy of the work load at impact. Increasing work load energy, for example, increases the inertial force of the control mass and correspondingly increases the pressure drop across the control orifice and the rearward pressure force on the control regulator spool. The increasing pressure force on the control spool, in turn, urges the spool to a balanced position further to the rear in the plunger, thereby reducing the effective area of the flow ports and increasing the fluid pressure in the cylinder to the proper level for retarding or arresting the increasing work loads. Diminishing work load energy has the reverse effect.

In any case, final arresting of the plunger at the end of its working stroke is accomplished by the hydraulic snubbing or locking action referred to earlier, which occurs when the leading end of the plunger piston 100 enters the annular snubbing recess or chamber 142 at the forward end of the cylinder, as shown in FIG. 6. The spring 120 then returns the plunger to its extended position when the load is removed from the plunger. During this return stroke of the plunger, the check valve 92 unseats to permit return fluid flow from the reservoir 20 to the high pressure working chamber 30, as shown in FIG. 7.

It will be recalled that the reservoir 20 contains an annular gas-filled (air) bladder 86. This bladder compresses as the work fluid is expelled into the reservoir during the working stroke of the plunger 14, thus to accommodate the entering fluid. In this regard, it will be understood that the bladder is sufficiently compressible to accommodate the entire volume of fluid which is displaced from the cylinder bore 46a during the working stroke. During the return stroke of the plunger, the then compressed gas in the bladder reexpands the bladder to its original volume, thereby displacing fluid from the reservoir back into the cylinder bore 46a through the cylinder end disc passages 90, 90a, 90b, 92a. The bladder permits complete filling of the shock absorber with fluid to accommodate any orientation of the device. If the shock absorber is always used in a horizontal position, the bladder may be eliminated, in which case the shock absorber is only partially filled to a level sufficient to cover the cylinder sleeve openings 88 in all positions of the plunger.

The primary and secondary flow regulating actions, which occur in the present shock absorber during its working stroke, coact to effect retarding or arresting of a work load to the desired terminal velocity at a uniform rate of deceleration, regardless of the load conditions, i.e., the kinetic energy of the work load at impact. In other words, the primary flow regulation produced by the control needle 38 and control regulator spool 40 tends, in effect, to progessively diminish fluid flow from the cylinder bore 46a to the reservoir 20 as the plunger decelerates under any given load condition and in response to the plunger travel or displacement in such manner as to maintain constant pressure in the cylinder, as required for uniform deceleration of the given load. The secondary flow regulation produced by the control spool, control mass 42, and control spring 44 tends, in effect, to adjust or regulate this constant pressure in response to the kinetic energy of each work load at impact and to the proper level for retardation or arresting of each load to the desired terminal velocity within the stroke length of the plunger. When the shock absorber is installed in the manner shown in FIG. 1, the terminal velocity is zero, of course. In other applications, the shock absorber may be actuated by the load through an intermediate force transmission means, such as a rocker, which releases the load for continued travel after deceleration of the load to some predetermined lower terminal or exit velocity.

It will now be understood that the present shock absorber may be conditioned to effect uniform deceleration of any load, within a given relatively wide range of load conditions, to a desired terminal velocity without manual adjustment by proper proportioning and sizing of the various parts of the shock absorber, particularly the control orifice 34, the control needle 38, and the control mass 42. By way of illustrating the various aberrations which the shock absorber may exhibit in the event that its parts are not thus properly proportioned and sized, reference is made to FIGS. 8–9e. In FIG. 8, the solid line curve a depicts the pressure or force curve of the ideal shock absorber under a given load condition. The present shock absorber, when properly constructed and adjusted, yields a pressure curve at each load condition within its range which conforms very closely to this ideal. The broken line curves b and c depict the pressure curves of the existing multiple orifice shock absorbers and hydraulic cushions referred to earlier. It is evident from this figure that the existing shock absorbers display pressure peaks at impact, at least under abnormal load conditions, and non-uniform deceleration, as mentioned earlier.

Improper construction of the present shock absorber may result in any of the adverse operating characteristics illustrated in FIGS. 9a–9e. Insufficient damping of the oscillatory motions, which occur in the present shock absorber, for example, yields the undesirable pressure curve of FIG. 9a. The adverse pressure curve of FIGS. 9b and 9c result, respectively, from excessive control mass and insufficient control mass. In this regard, it is evident that an excessive control mass will tend to retard the initial deceleration and reduce the initial velocity of the plunger during the initial portion of its work stroke and then exert an excessive inertial force during the final portion of the stroke. This results in a pressure curve like that of FIG. 9b. An insufficient control mass has just the opposite effect and results in a pressure curve like that of FIG. 9c. Improper sizing of the control needle and excessive control mass may yield a pressure curve like that of FIG. 9d. In this case, the control needle is too small in diameter at its rear end and too large in diameter at its front end. Reversing the improper sizing of the control needle will produce a pressure curve similar to but displaced 180°, in effect, from the curve shown. Correction of the control mass transforms the pressure curve of FIG. 9d to that of FIG. 9e. The needle sizing may then be corrected to yield the ideal pressure curve a of FIG. 8.

I claim:

1. A load responsive shock absorber operable over a wide range of load conditions without manual adjustment: comprising relatively movable members including a driven member to be driven through a working stroke by a work load, said members defining work chamber means for containing hydraulic working fluid, and orifice means through which said fluid is displaced from said chamber means by said driven member during said working stroke thereof to produce a hydraulic retarding pressure and a resulting hydraulic retarding force on said driven member, and automatic pressure regulating means for regulating said orifice means in response to both the travel of said driven member and the kinetic energy of said work load at impact with said driven member in such manner as to maintain said retarding pressure and force relatively constant at levels proportional to said load impact energy and of the proper magnitude to retard said load to a predetermined terminal velocity at the end of said work stroke regardless of the load conditions within said range, wherein said driven member is a plunger and the other member is a cylinder in which said plunger moves through its working stroke, and said force balance means comprise a floating orifice regulating element carried by and axially movable relative to said plunger, a control mass axially slidable in said plunger, a control spring acting between said mass and regulating element for transmitting forward inertial force from said mass to said element, and a fixed orifice regulating element carried by and extending axially through said cylinder, and said orifice means comprise a control orifice defined between said regulating elements which is progressively reduced in area by relative forward movement of said floating element along said fixed element and through which flow occurs during said working stroke to produce on said floating element a rearward pressure force opposing said inertial force.

2. A load responsive shock absorber operable over a wide range of load conditions without manual adjustment: comprising relatively movable members including a driven member to be driven through a working stroke by a work load, said members defining work chamber means for containing hydraulic working fluid, and orifice means through which said fluid is displaced from said chamber means by said driven member during said working stroke thereof to produce a hydraulic retarding pressure and a resulting hydraulic retarding force on said driven member, and automatic pressure regulating means for regulating said orifice means in response to both the travel of said driven member and the kinetic energy of said work load at impact with said driven member in such manner as to maintain said retarding pressure and force relatively constant at levels proportional to said load impact energy and of the proper magnitude to retard said load to a predetermined terminal velocity at the end of said work stroke regardless of the load conditions within said range, wherein said automatic pressure regulating means comprise primary pressure regulating means for progressively reducing the effective area of said orifice means according to a predetermined function of the work stroke travel of said driven member in such a way that said primary regulating means tends to maintain said retarding pressure and force constant during uniform deceleration of said driven member to said predetermined terminal velocity under any given load condition, and secondary pressure regulating means for regulating said effective orifice area independently of said primary regulating means and according to a function of the initial work stroke velocity of said driven member in such a way that said secondary regulating means tends to maintain said constant retarding pressure and force at levels proportional to said load impact energy and of the proper magnitude to uniformly decelerate said load to said predetermined terminal velocity, wherein said orifice means comprise a control orifice, said primary regulating means comprise coacting orifice regulating elements carried by said members, respectively, which define therebetween said control orifice and undergo relative movement along a given direction line during the working stroke of said driven member to progressively reduce the effective area of said control orifice according to said function of work stroke travel, and said secondary regulating means comprise force balance means for relatively positioning said regulating elements along said direction line independently of the relative movement of said members and in response to opposing forces proportional to the pressure drop across said control orifice and the initial velocity of said driven member, wherein said coacting orifice regulating elements comprise a floating regulating element carried by said driven member for floating movement relative thereto along the direction line of work stroke travel of the latter member and a stationary regulating element carried by the other member, the pressure drop across said control orifice produces a pressure force on said floating element which urges the latter element in a rearward direction relative to the work stroke travel of said driven member, and said force balance means comprise a control mass carried by said driven member for floating movement relative thereto along said direction line of work stroke travel, and a spring acting between said floating element and control mass, whereby the latter urges said floating element forwardly during deceleration of said driven member under the action of said retarding force.

3. A shock absorber according to claim 2: wherein said stationary regulating element comprises a tapered control needle which increases in diameter in the forward direction along the needle, and said floating regulating element comprises an annular control regulator spool surrounding and movable axially of said control needle during the work stroke of said driven member.

4. A load responsive shock absorber operable over a wide range of load conditions without manual adjustment: comprising relatively movable members including a driven member to be driven through a working stroke by a work load, said members defining work chamber means for containing hydraulic working fluid, and orifice means through which said fluid is displaced from said chamber means by said driven member during said working stroke thereof to produce a hydraulic retarding pressure and a resulting hydraulic retarding force on said driven member, and automatic pressure regulating means for regulating said orifice means in response to both the travel of said driven member and the kinetic energy of said work load at impact with said driven member in such manner as to maintain said retarding pressure and force relatively constant at levels proportional to said load impact energy and of the proper magnitude to retard said load to a predetermined terminal velocity at the end of said work stroke regardless of the load conditions within said range, wherein said work chamber means comprises a high pressure work chamber and said orifice means comprise a control orifice communicating with said work chamber through which fluid is displaced from said chamber to produce fluid pressure in said chamber for retarding said driven member during its working stroke, and said pressure regulating means comprise primary pressure regulating means for progressively reducing flow from said chamber through said control orifice during and in accordance with a predetermined function of work stroke travel of said driven member in such a way that said primary regulating means tends to maintain the chamber pressure constant during uniform deceleration of said driven member to said terminal velocity under a given load condition, and secondary pressure regulating means for regulating flow through said control orifice independently of said primary regulating means according to a predetermined function of the initial velocity of said driven member in such a manner that said secondary regulating means tends to maintain the pressure drop across said control orifice constant at a level proportional to said load impact energy and thereby maintain the proper constant fluid pressure level in said chamber for retarding said load to said predetermined terminal velocity regardless of the load impact energy, wherein said work chamber means further comprises a low pressure work chamber communicating with said high pressure chamber through said control orifice, and said orifice means further comprise a flow port for discharging fluid from said low pressure chamber, whereby working fluid is displaced from said high pressure chamber to said low pressure chamber through said orifice and from said low pressure chamber through said port during the working stroke of said driven member, said primary regulating means comprise coacting stationary and floating orifice regulating elements carried by said members, respectively, for relative movement along the direction line of work stroke travel of said driven member, said elements define therebetween said control orifice and are shaped to progressively reduce the effective area of said orifice during and in accordance with said function of work stroke travel, said floating element is movable along said direction line relative to its respective member and to said stationary element independently of the work stroke travel of said driven member and includes means for regulating the effective area of said orifice and port in inverse relation in response to movement of said floating element relative to its respective member, and said secondary pressure regulating means comprise force balance means for exerting on said floating regulating element in the direction of its floating movement relative to its respective member opposing inertial and fluid pressure forces proportional, respectively, to the initial velocity of said driven member and the pressure drop across said orifice in such manner as to maintain a constant pressure drop across said orifice and constant fluid pressure in said work chambers proportional to said load impact energy, wherein the other member is a cylinder containing a bore and said driven member is a plunger having a forward piston slidable in said bore, said cylinder and piston define therebetween said high pressure chamber and said plunger has a central opening extending through the front portion of said piston and defining said low pressure chamber, said stationary regulating element comprises a tapered control needle secured to the front portion of said cylinder and extending axially through said bore, said floating regulating element comprises a tubular control regulator spool axially slidable in the front portion of said plunger and surrounding said control needle to define therebetween said control orifice, said flow port is formed in the wall of said plunger rearwardly of said control orifice and communicates said low pressure chamber to a fluid discharge opening in said cylinder, said force balance means comprise a control mass axially slidable in said plunger rearwardly of said spool and a control spring acting between said mass and spool, said spool includes means for reducing the effective area of said port upon rearward movement of the spool relative to said plunger and enlarging the effective area of said port upon forward movement of the spool relative to said plunger, and said control needle tapers to a larger diameter in the forward direction along the needle, whereby rearward movement of said spool relative to said needle enlarges the effective area of said orifice and forward movement of said spool relative to said needle reduces the effective area of said orifice.

5. A shock absorber according to claim 4: wherein said cylinder has a reservoir communicating with said discharge opening and with the forward end of said high pressure chamber through passage means containing a check valve which seats to block flow from the latter chamber to said reservoir.

6. A shock absorber according to claim 5: including a gas-filled bladder in said reservoir which compresses to accommodate fluid displacement into said reservoir during said working stroke, whereby said chambers and reservoir may be filled completely with said working fluid.

7. A load responsive shock absorber operable over a wide range of load conditions without manual adjustment: comprising relatively movable members including a driven member to be driven through a working stroke by a work load, said members defining work chamber means for containing hydraulic working fluid, and orifice means through which said fluid is displaced from said chamber means by said driven member during said working stroke thereof to produce a hydraulic retarding pressure and a resulting hydraulic retarding force on said driven member, said orifice means comprising an orifice element carried by and shiftable axially of one of said members and a regulating element carried by said other member and relatively movable with respect to said orifice element to decrease the effective area of said orifice element as said driven member displaces fluid from said chamber means during the working stroke of said driven member, said one of said members having one or more fluid ports, said orifice element being movable with respect to said one or more ports in shifting axially of said one of said members in response to fluid pressure in said chamber means to decrease the effective area of said one or more fluid ports, and an inertia member separate from said orifice means and carried by and shiftable axially of said one of said members and operatively associated with said orifice element to urge said orifice element axially of said one of said members in a direction increasing the effective area of said one or more ports.

8. A shock absorber according to claim 7: wherein the other member contains a reservoir communicating with said chamber means through said orifice means, and one or more ports, whereby fluid is displaced into said reservoir during said working stroke, said reservoir communicating with the forward end of said chamber means through passage means containing a check valve which seats to block flow through said passage means from said chamber means to said reservoir.

9. A shock absorber according to claim 8: including a gas-filled bladder in said reservoir which compresses to accommodate fluid displacement into said reservoir during said working stroke, whereby said reservoir and chamber means may be filled completely with said working fluid.

References Cited

UNITED STATES PATENTS

| | | |
|---|---|---|
| 462,970 | 11/1891 | Krone. |
| 2,329,803 | 9/1943 | Whisler. |
| 2,916,281 | 12/1959 | Hehn. |
| 3,024,875 | 3/1962 | Stultz. |
| 3,079,897 | 3/1963 | Kirsch _____ 188—96 |
| 3,216,535 | 11/1965 | Schultze. |

GEORGE E. A. HALVOSA, Primary Examiner

U.S. Cl. X.R.

104—256; 188—100; 213—43, 223